US012790952B2

(12) United States Patent
Mena Dominguez

(10) Patent No.: US 12,790,952 B2
(45) Date of Patent: Nov. 10, 2026

(54) COMPLIANT FEEDTHROUGHS FOR GAS TURBINE ENGINES

(71) Applicant: General Electric Company, Schenectady, NY (US)

(72) Inventor: Rodolfo Mena Dominguez, Querétaro (MX)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/150,664

(22) Filed: Jan. 5, 2023

(65) Prior Publication Data

US 2024/0229667 A1 Jul. 11, 2024

(51) Int. Cl.
*F01D 11/00* (2006.01)
*F01D 25/16* (2006.01)

(52) U.S. Cl.
CPC .......... *F01D 11/003* (2013.01); *F01D 11/005* (2013.01); *F01D 25/164* (2013.01); *F05D 2240/55* (2013.01)

(58) Field of Classification Search
CPC .... F01D 11/003; F01D 11/005; F01D 25/164; F05D 2240/55
See application file for complete search history.

(56) References Cited

U.S. PATENT DOCUMENTS 2,304,859 A * 12/1942 Strickland ............... C23C 14/56 118/725
3,205,875 A * 9/1965 Praxmarer .............. F01C 21/18 123/243
3,485,538 A * 12/1969 Nogle ...................... F16C 23/04 384/215
3,781,073 A * 12/1973 Jorn ....................... F16F 1/3863 403/228
4,702,667 A 10/1987 Hounsfield et al.
4,923,377 A * 5/1990 Cavalleri .............. F04C 27/005 277/369
5,308,226 A 5/1994 Venkatasubbu et al.
6,808,364 B2 10/2004 O'Reilly et al.
7,214,030 B2 5/2007 Arilla et al.
7,587,824 B2 * 9/2009 Pervaiz ................. F16K 5/0485 29/402.02

(Continued)

FOREIGN PATENT DOCUMENTS

CA 2458878 A1 * 7/2000 .............. F01L 1/024
CN 101371006 A * 2/2009 ................ F01B 9/06
WO WO-2021051461 A1 * 3/2021 .............. F04C 15/00

OTHER PUBLICATIONS

Machine Translation of CN101371006A PDF File Name: "CN101371006A_Machine_Translation.pdf" (Year: 2009).*

(Continued)

*Primary Examiner* — Grant Moubry
*Assistant Examiner* — Ruben Picon-Feliciano
(74) *Attorney, Agent, or Firm* — Hanley, Flight & Zimmerman, LLC

(57) ABSTRACT

Separators for use with gas turbine engines are disclosed herein. An example apparatus disclosed herein includes a rod and a joint to be disposed within a scaling wall, the joint including a bushing portion, the rod extending through the bushing portion and a disk portion including a slot, the disk portion concentric with the bushing portion.

19 Claims, 8 Drawing Sheets

(56) References Cited

U.S. PATENT DOCUMENTS

| | | | | |
|---|---|---|---|---|
| 7,980,815 | B2 * | 7/2011 | Cloarec | F04D 29/563 415/160 |
| 8,517,661 | B2 | 8/2013 | Schilling | |
| 8,668,443 | B2 * | 3/2014 | Espasa | F01D 17/165 415/165 |
| 8,714,916 | B2 | 5/2014 | Jarrett, Jr. et al. | |
| 8,794,587 | B2 * | 8/2014 | Cant | F01D 5/326 415/190 |
| 9,746,029 | B1 * | 8/2017 | Mook | F01D 25/164 |
| 9,885,386 | B2 | 2/2018 | Khera et al. | |
| 10,767,693 | B2 * | 9/2020 | Stieger | F16C 32/0677 |
| 11,346,240 | B2 * | 5/2022 | Little | F01D 17/141 |
| 2004/0115051 | A1 | 6/2004 | O'Reilly et al. | |
| 2005/0036885 | A1 | 2/2005 | Arilla et al. | |
| 2007/0089533 | A1 | 4/2007 | Englund et al. | |
| 2012/0076641 | A1 | 3/2012 | Jarrett, Jr. et al. | |
| 2013/0101385 | A1 | 4/2013 | Schilling | |
| 2016/0237838 | A1 * | 8/2016 | Kennedy | F02C 6/12 |
| 2016/0363163 | A1 | 12/2016 | Khera et al. | |
| 2021/0310367 | A1 | 10/2021 | Clanahan | |

OTHER PUBLICATIONS

Machine Translation of CA2458878A1 PDF File Name: "CA2458878A1_Machine_Translation.pdf" (Year: 2000).*

Machine Translation of WO2021051461A1 PDF File Name: "WO2021051461A1_Machine_Translation.pdf" (Year: 2021).*

Machekposhti et al., "A Review on Compliant Joints and Rigid-Body Constant Velocity Universal Joints Toward the Design of Compliant Homokinetic Couplings," Journal of Mechanical Design, vol. 137, No. 3, published Jan. 15, 2015, retrieved from <doi.org/10.1115/1.4029318> on Apr. 2, 2026, 12 pages.

* cited by examiner

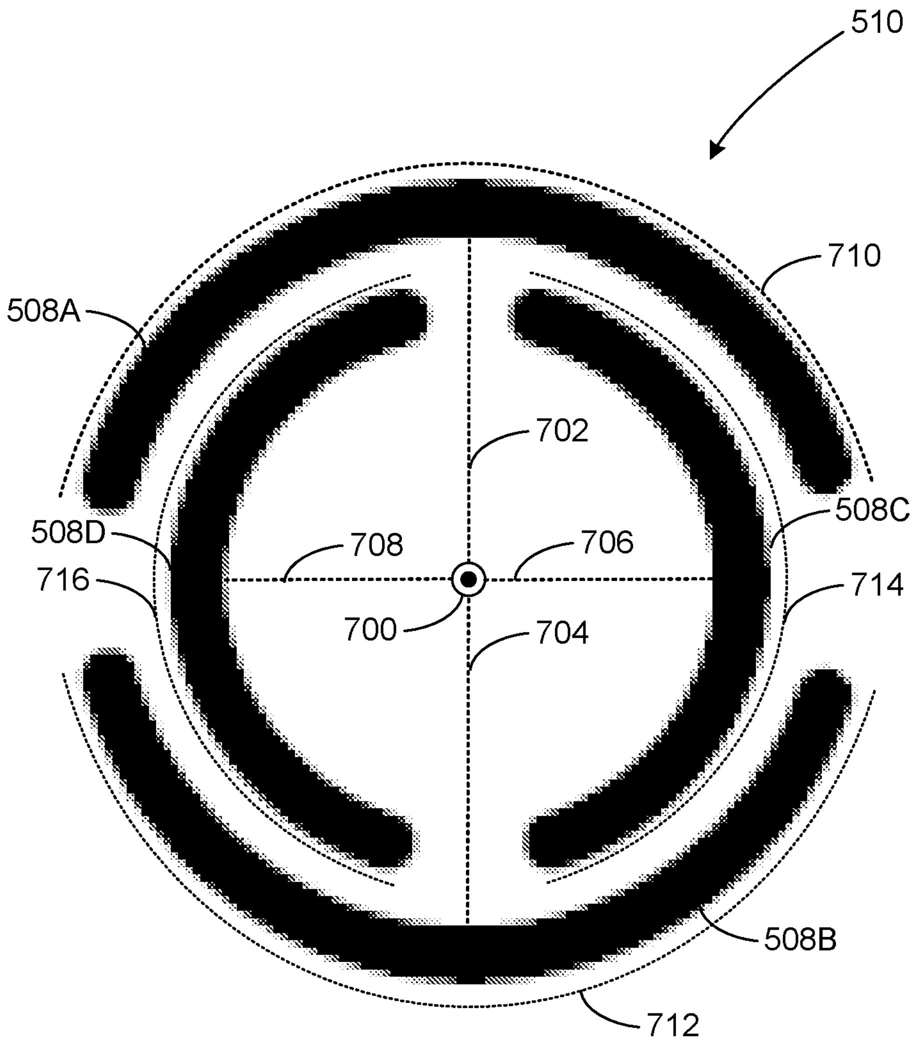
FIG. 7
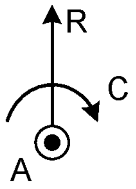

COMPLIANT FEEDTHROUGHS FOR GAS TURBINE ENGINES

FIELD OF THE DISCLOSURE

This disclosure relates generally to gas turbine engines and, more particularly, to compliant feedthroughs for gas turbine engines.

BACKGROUND

Turbine engines are some of the most widely used power-generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

BRIEF DESCRIPTION OF THE DRAWINGS

FIG. 7 is a front view of a slot pattern of the compliant feedthrough of FIG. 5.

Figure 1:
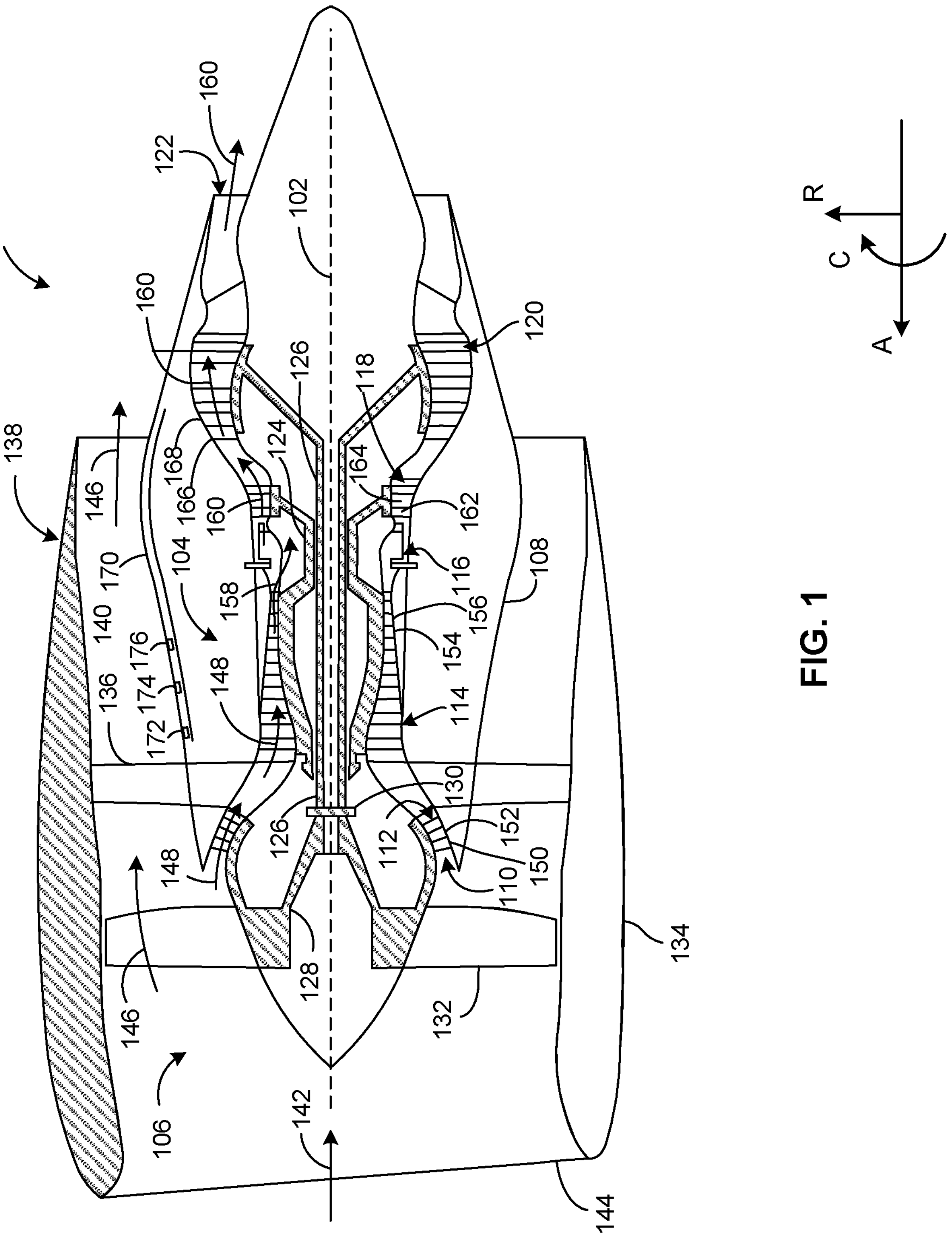
FIG. 1 is a cross-sectional view of a gas turbine engine in which examples disclosed herein may be implemented.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Some figures are depicted herein with parts that include cross-hatching to indicate such parts are illustrated in cross-section. To distinguish between different parts depicted in a figure, different cross-hatching patterns are applied to different parts. The different cross hatching patterns should not be interpreted as implying any characteristics regarding the part. Additionally, a same cross-hatching pattern used on different sheets should not be interpreted as implying any relationship between the parts with the same cross-hatching pattern.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or as terms, such "about", "approximately", and "substantially", are not to be limited to the precise value specified. In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, a substantially flush relationship is within three degrees of being flush, etc.).

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. In general, the attached figures are annotated with a set of axes including the axial axis A, the circumferential axis C, and the radial axis R.

The terms "hole" and "opening" are used interchangeable to refer to apertures in a structure. However, different instances of these terms should not be taken to limit the scope of the subject matter described therewith. Instead, the terms are used for clarity and/or descriptive purposes only.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

Example compliant feedthrough joints disclosed herein can be used in conjunction with fire seal walls of gas turbine engines. The example compliant feedthrough joints disclosed herein include circular plates composed of a disk portion and a bushing portion. In some such examples disclosed herein, the disk portions of the compliant feedthrough joints include slot patterns that enable the flexing of the joint along the pitch axis and/or yaw axis. In some such examples disclosed herein, the slots of the compliant feed-through joints can include features that prevent fire from spreading through the joints. In some such examples disclosed herein, the bushing portion of the compliant feed-through joints receives a rod of the rod assembly. In some such examples disclosed herein, the bushing portion can include a low-friction liner to prevent wear between the bushing portion and the rod. Example compliant feed-through joints eliminate the use of spherical bearings, which reduces the cost of manufacturing and servicing of such actuation rod assemblies.

A turbine engine, also referred to herein as a gas turbine engine, is a type of internal combustion engine that uses atmospheric air as a moving fluid. In operation, atmospheric air enters the turbine engine via a fan and flows through a compressor section in which one or more compressors progressively compress (e.g., pressurizes) the air until it reaches the combustion section. In the combustion section, the pressurized air is combined with fuel and ignited to produce a high-temperature, high-pressure gas stream (e.g., hot combustion gas) before the gas stream enters a turbine section. The hot combustion gases expand as they flow through the turbine section, causing the blades of one or more turbines to spin. The rotating blades of the turbine produce a spool work output that powers a corresponding compressor. The spool is a combination of the compressor, a shaft, and the turbine. Turbine engines often include a plurality of spools, such as a high-pressure spool (e.g., HP compressor, shaft, and turbine) and a low-pressure spool (e.g., LP compressor, shaft, and turbine). A turbine engine can include one spool or more than two spools in additional or alternative examples.

"Including" and "comprising" (and all forms and tenses thereof) are used herein to be open ended terms. Thus, whenever a claim employs any form of "include" or "comprise"(e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Many gas turbine engines use variable stator vanes (VSVs), which enable the angle of attack of compressor stator vanes to be changed to increase engine efficiency based on flight phase, engine speed, etc. In some gas turbine engine configurations, such VSVs are controlled via a rod coupled to a mechanical actuator. An operator of the gas turbine engine can control the position of the VSVs via the actuation of the rod. Some such actuators are segregated from the portion of the engine containing the VSVs (e.g., the portion of the engine housing the compressor, etc.) via a fire seal wall to prevent damage to the actuators and adjacent engine components (e.g., the accessory gearbox, etc.) in the event of a fire in that portion. In some such configurations, the rod connecting the actuator and the VSVs must pass through this fire seal via a feedthrough that is compliant to the movement of the rod. Many prior feedthrough joints include spherical bearings, which allow movement of the rod within the feedthrough joint. However, spherical bearings often wear quickly due to friction between the ball and race of the bearing and can be costly to manufacture, assembly, and service.

Examples feedthrough joints disclosed herein maintain the integrity of the fire seal wall, are compliant to rotation caused by the rod, and are cheaper to manufacture, assembly and service than prior feedthrough joints that include spherical bearings. Example compliant joints disclosed herein include a disk portion, which includes a plurality of slots, and a bushing portion, which receives a rod coupled to an actuator. In some examples disclosed herein, the slots of the disk portion enable the elastic compliance/rotation of the joint, which can mitigate the need for prior spherical bearings. In some examples disclosed herein, the slots can include elastomers that control the potential spread of flames therethrough and/or dampen vibration of the disk.

Referring now to the drawings, wherein identical numerals indicate the same elements throughout the figures, FIG. 1 is a schematic cross-sectional view of a turbofan-type gas turbine engine 100 ("turbofan 100"). While the illustrated example is a high-bypass turbofan engine, the principles of the present disclosure are also applicable to other types of engines, such as low-bypass turbofans, turbojets, turboprops, etc. As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106. FIG. 1 also includes an annotated directional diagram with reference to an axial direction A, a circumferential direction C, and a radial direction R.

The core turbine 104 generally includes a substantially tubular outer casing 108 ("turbine casing 108") that defines an annular inlet 110. The outer casing 108 can be formed from a single casing or multiple casings. The outer casing

108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 (also referred to herein as the fan case 134) circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172-176. The cowling 170 is a covering which may reduce drag and cool the engine. The offset-arch gimbals 172-176 may, for example, include infrared cameras to detect a thermal anomaly in the under-cowl area of the turbofan 100.

Figure 2:
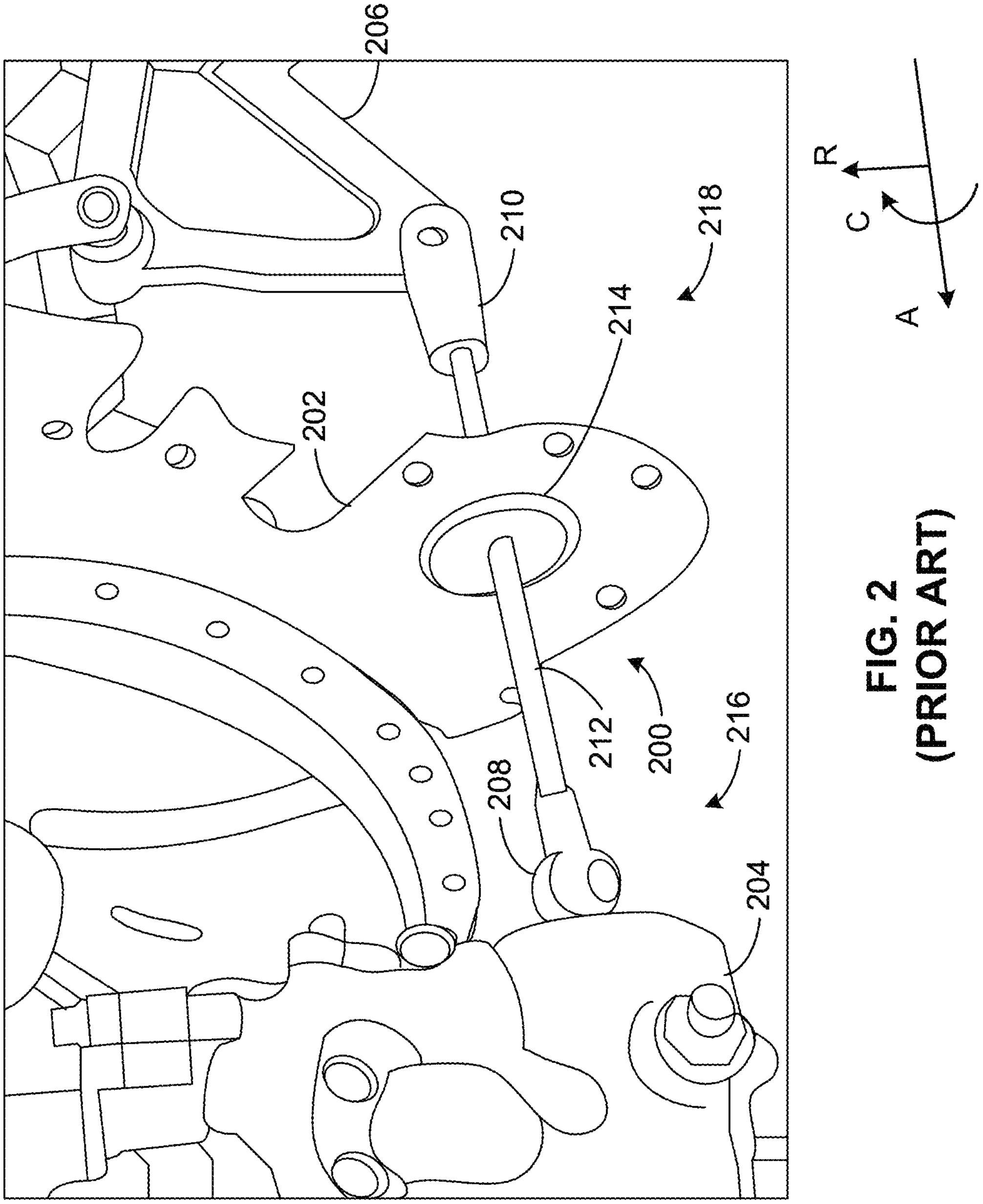
FIG. 2 (PRIOR ART)
FIG. 2 is a perspective view of a seal wall that can be used in conjunction with the engine of FIG. 1.

FIG. 2 is a perspective view of a prior rod assembly 200 and a seal wall 202 that can be used in conjunction with the engine 100 of FIG. 1. In FIG. 2, the prior rod assembly 200 is coupled to an actuator 204 to a control arm 206. In FIG. 2, the prior rod assembly 200 includes a first joint 208 coupled to the actuator 204, a second joint 210 coupled to the control arm 206, a rod 212, and a feedthrough 214. In FIG. 2, the seal wall 202 separates (e.g., isolates, segregates, etc.) a first cavity 216 of the engine 100 from a second cavity 218 of the engine 100.

In FIG. 2, the first cavity 216 generally corresponds to a forward cavity of the engine 100 (e.g., a cavity adjacent to the fan of the engine 100, etc.) and the second cavity 218 generally corresponds to a compressor cavity (e.g., a cavity housing the compressor, etc.) of the engine 100. It should be appreciated that the first cavity 216 and the second cavity 218 include components that are not illustrated in FIG. 2 to better display the operation of the prior rod assembly 200. In FIG. 2, the seal wall 202 prevents fire from spreading from the second cavity 218 to the first cavity 216. Particularly, during the operation of the engine 100 fire (e.g., flames, etc.) can occur in the second cavity 218 due to the operation of the core turbine 104 of the engine 100 (e.g., flames from the combustion section 116, etc.). Components in the first cavity 216, including the actuator 204, can be highly sensitive to flames. As such, the seal wall 202 protects these components from fire from the second cavity 218. In other examples, the first cavity 216 and the second cavity 218 can correspond to other cavities in the engine (e.g., the first cavity 216 can including a combustor and the second cavity 218 can correspond to a cavity including a combustor, etc.).

The control arm 206 can be coupled to an actuation linkage of a VSV ring of the engine 100. In such configurations, the movement of the control arm 206 can control the rotational position of the stators coupled to the VSV rings. The rod 212 conveys a mechanical input from the actuator to the control arm 206. Particularly, the actuator 204 is capable of translating the rod 212 linearly along the axial axis. The joint 210 is pivotally coupled to the control arm 206 and the translation of the rod 212 causes the control arm 206 to change position. As such, the position of the VSVs of the engine 100 can be controlled via the actuator 204.

The feedthrough 214 is a structure disposed within a hole of the seal wall 202. In FIG. 2, the feedthrough 214 includes an orifice through which the rod 212 passes through. The feedthrough 214 includes a spherical bearing that facilitates misalignment of the rod 212 within the feedthrough 214. The feedthrough 214 of FIG. 2 is described below in conjunction with FIGS. 3A and 3B.

Figure 3A:
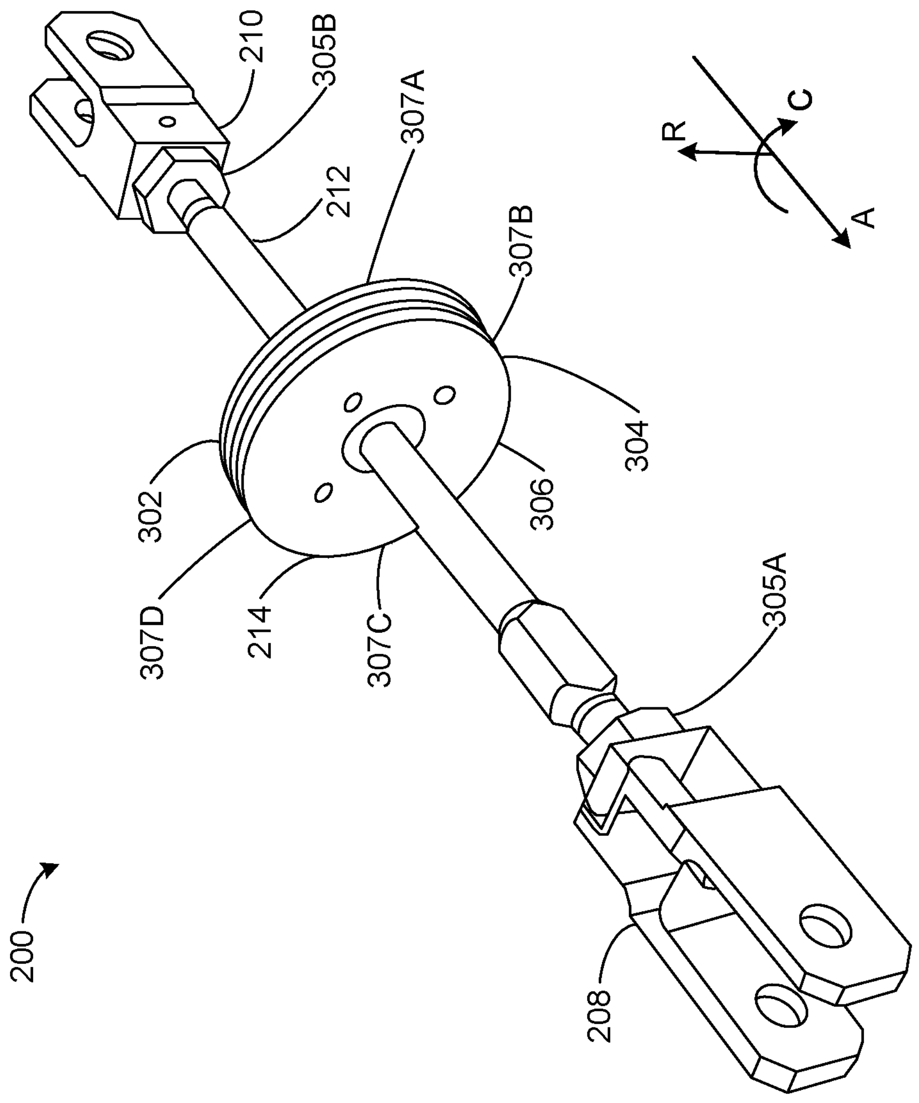
FIG. 3A (PRIOR ART)
FIG. 3A is a perspective view of a prior sliding rod assembly that can be used in conjunction with the seal wall of FIG. 2.
Figure 3B:
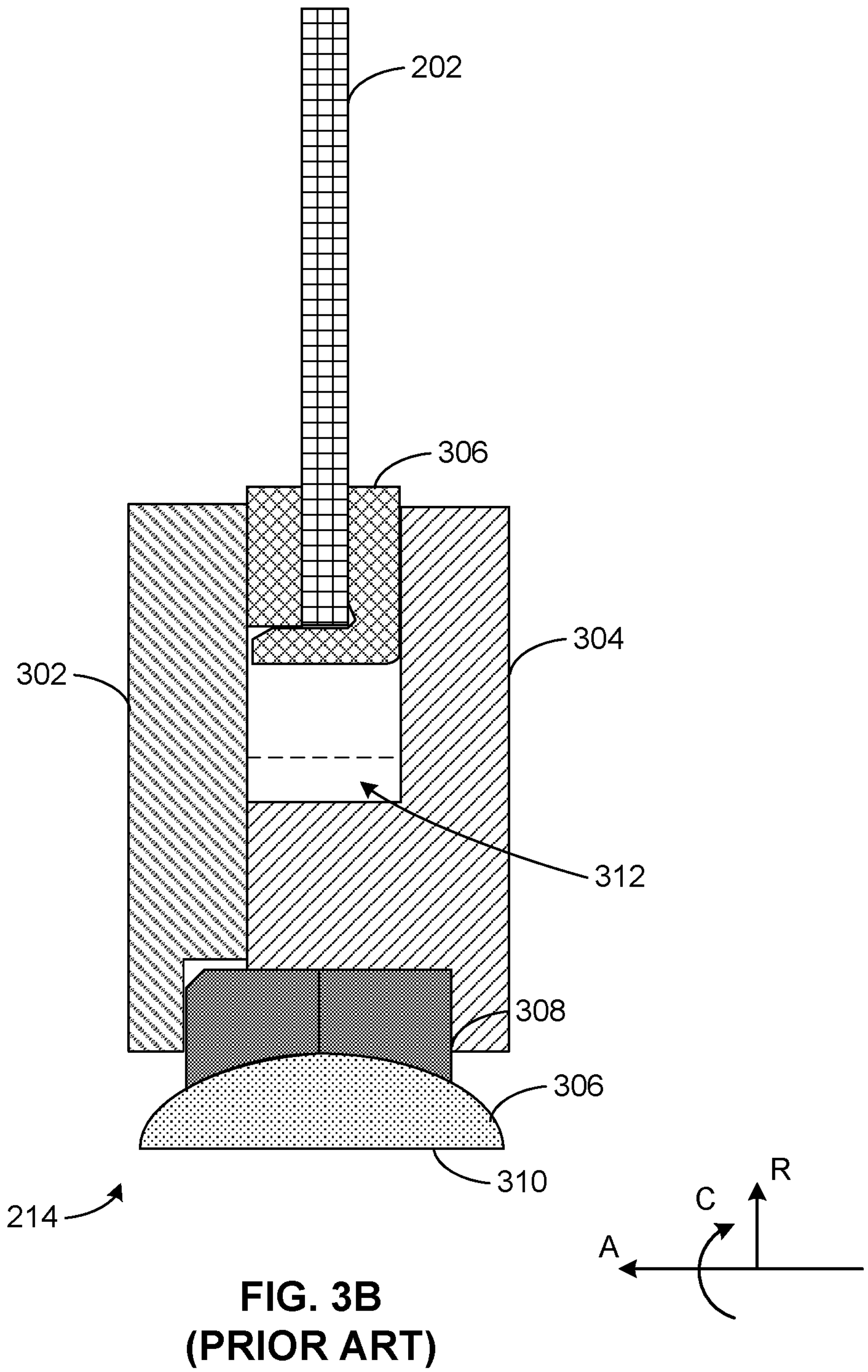
FIG. 3B (PRIOR ART)
FIG. 3B is a cross-sectional view of the prior sliding rod assembly of FIG. 3A.

FIG. 3A is a perspective view of a prior rod assembly 200 of FIG. 2. FIG. 3B is a partial cross-sectional view of the feedthrough 214 of FIG. 2 and FIG. 3A depicting a portion (e.g., an upper portion, etc.) of the feedthrough 214. The prior rod assembly 200 includes the first joint 208 of FIG. 2, the second joint 210 of FIG. 2, the rod 212 of FIG. 2, and the feedthrough 214 of FIG. 2. In FIGS. 3A and 3B, the feedthrough 214 includes a first lid 302, a second lid 304, and a spherical bearing 306. In FIG. 3A, the rod 212 is coupled to the first joint 208 at a first end via a first nut 305A and is coupled to the second joint 210 at a second end via a second nut 305B. In FIG. 3B, the spherical bearing 306 includes a race 308 (e.g., a raceway, a smooth surface which permits rotation of the ball, etc.) and a ball 310 (e.g., the rotational element, etc.). The lids 302, 304 of the feedthrough 214 are disposed about the opening of the seal wall 202. In some examples, the lids 302, 304 are coupled via one or more through-fasteners disposed in one or more holes 307A, 307B, 307C, 307D. In FIG. 3B, the spherical bearing 306 is retained within the feedthrough 214 via the coupling of the lids 302, 304.

The ball 310 of the spherical bearing 306 is able to rotate within the race 308. That is, the rotation of ball 310 within the race 308 enables the spherical bearing 306 to react to forces applied along the radial direction, but is otherwise able to rotate in response to moments applied to the spherical bearing 306. As the rod 212 slides within the spherical bearing 306 of the feedthrough 214, if the rod 212 is misaligned and/or off-tolerance, the rod 212 can exert one or more loads on the ball 310. The race 308 reacts radially applied loads, but freely rotates in response to moments applied by the rod 212. The gap 312 of FIG. 3B enables the feedthrough 214 to displace outwards in response to radially applied loads by the rod 212. In some examples, wear in the race 308 by the ball 310 can be difficult to observe during servicing. Accordingly, it can be difficult to determine if the spherical bearing 306 is at the end of service life and needs to be replaced. Additionally, the spherical bearing 306 is a comparatively expensive component, due to the surface finishing and tolerancing required for the interface between the ball 310 and the race 308, among other reasons.

Figure 4:
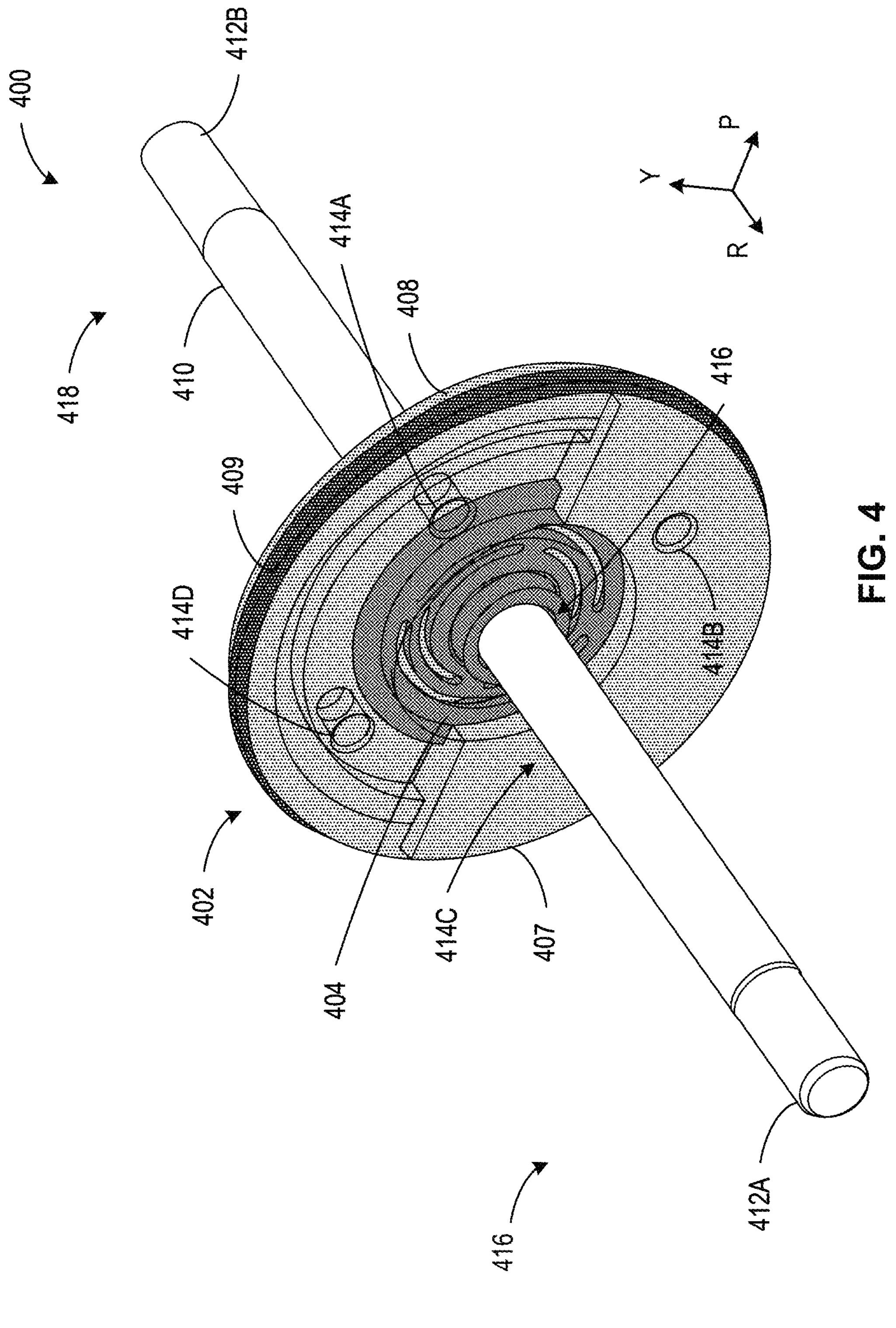
FIG. 4 is a perspective view of a sliding rod assembly including a compliant feedthrough implemented in accordance with the teachings of this disclosure.

FIG. 4 is a perspective view of an example sliding rod assembly 400 including an example compliant feedthrough assembly 402 implemented in accordance with the teachings of this disclosure. In the illustrated example of FIG. 4, the compliant feedthrough assembly 402 includes an example compliant joint 404, an example first lid 407, an example second lid 408, and an example wall adapter 409. In the example of FIG. 4, the sliding rod assembly 400 also includes an example rod 410, which includes an example first end 412A and an example second end 412B.

The lids 407, 408 are radially disposed about the rod 410. The lids 407, 408 can be implemented by structures similar to the lids 302, 304 of FIGS. 3A and 3B, except that the lids 407, 408 have different internal geometries to accommodate the complaint joint 404. In some examples, the outer diameter of the lids 407, 408 overlap the edge of an opening of the sealing wall (e.g., the seal wall 202 of FIG. 2, etc.) that separates the first cavity 416 from the second cavity 418. The lids 407, 408 can be manufactured via negative manufacturing (e.g., machining, etc.) and/or additive manufacturing.

In the illustrated example of FIG. 4, the compliant joint 404 and the wall adapter 409 are disposed within the lids 407, 408. In some examples, the compliant joint 404 and the wall adapter 409 are retained within the compliant feedthrough assembly 402 via the coupling of the lids 407, 408. In the illustrated example of FIG. 4, the lids 407, 408 include a first hole 414A, a second hole 414B, a third hole 414C, and a fourth hole 414D. The lids 407, 408 of FIG. 4 can be coupled via one or more fasteners (e.g., bolts, screws, rivets, etc.) and extends through the example holes 414A, 414B, 414C, 414D. In other examples, the lids 407, 408 can be coupled by one or more welds, one or more other fasteners, one or more chemical adhesives, one or more press fits, one or more shrink fits, and/or a combination thereof. In some such examples, the holes 414A, 414B, 414C, 414D can be absent. An example configuration of the compliant joint 404, the lids 407, 408, and the wall adapter 409 is described below in conjunction with FIG. 6.

The example rod 410 can be implemented by the rod 212 of FIG. 2 and FIG. 3A. In some examples, the first end 412A of the rod 410 can be coupled to the first joint 208, and the actuator 204 and the second end 412B of the rod 410 can be coupled to the second joint 210 and the control arm 206. Additionally or alternatively, the rod 410 can extend between any suitable structure that requires mechanical inputs to be transferred between isolated cavities. In other examples, the rod 410 can have any suitable cross-sectional geometry (e.g., elliptical, polygonal, etc.) The rod 410 can have a hollow cross-section and/or solid cross-section.

During operation, the rod 410 translates along the roll axis and slides within an example cavity 416. In some examples, misalignment of the rod 410 can cause loads to be applied to the compliant joint 404, which is reacted by the lids 407, 408. In some such examples, the reaction of the load applied the rod 410 causes a bending moment to be applied to the compliant joint 404 and the corresponding bending of the compliant joint 404 (e.g., strain, etc.). As the bending moment can be changed based on the axial position of the rod 410, the compliant joint 404 is capable of being repeatedly bent (e.g., flexed, elastically deformed, etc.) without plastic deformation and/or significant wear (e.g., without cracking, without fretting, etc.). The compliant joint 404 is described in additional detail below in conjunction with FIG. 5.

Figure 5:
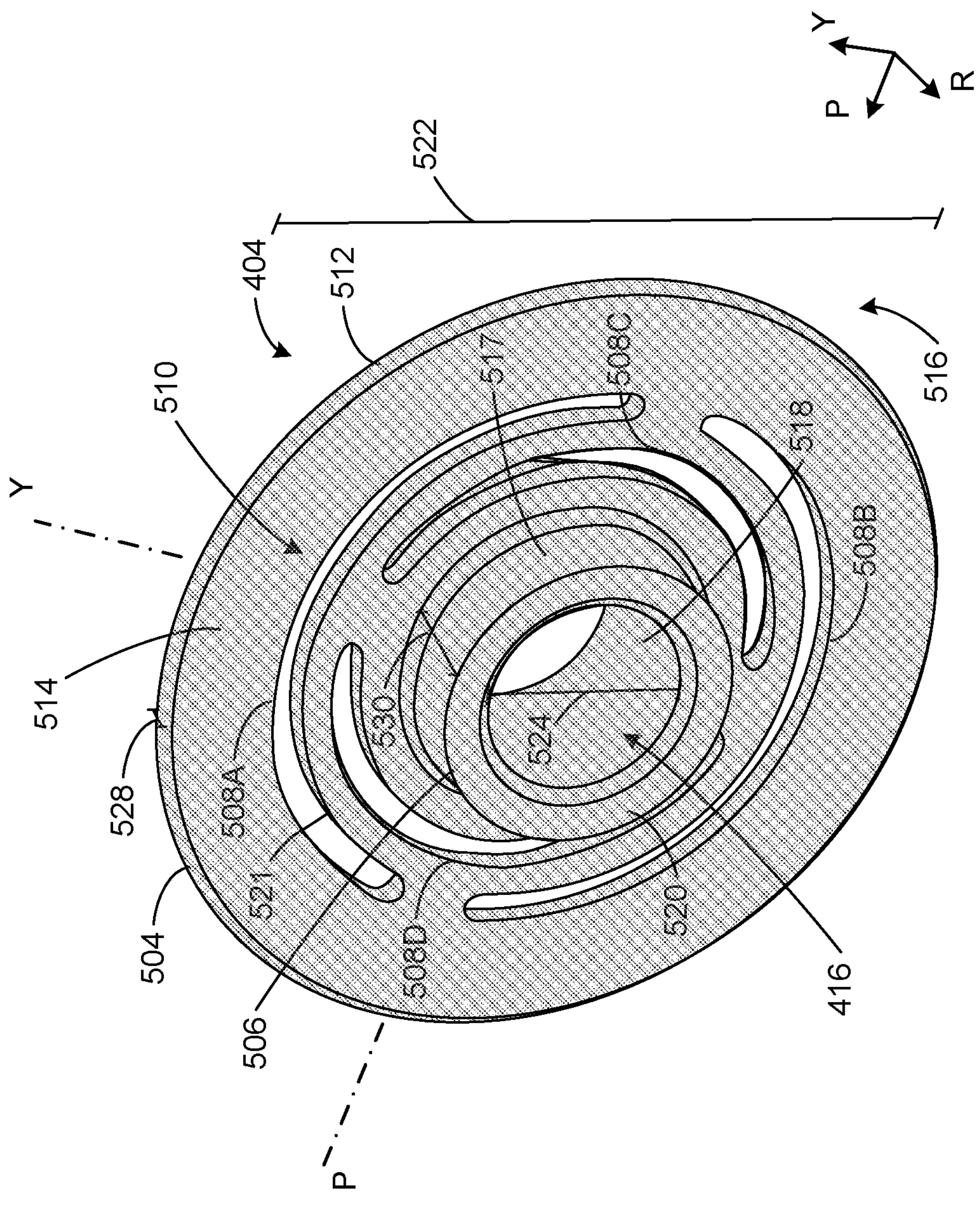
FIG. 5 is a perspective view of the compliant feedthrough joint of FIG. 4.

FIG. 5 is a perspective view of the compliant joint 404 of FIG. 4, which includes an example disk portion 504 and an example bushing portion 506. In the illustrated example of FIG. 5, the disk portion 504 includes a first slot 508A, a second slot 508B, a third slot 508C, and a fourth slot 508D, which are arranged in an example slot pattern 510.

In the illustrated example of FIG. 5, the compliant joint 404 is an integral component. That is, in the illustrated example of FIG. 5, the disk portion 504 and the bushing portion 506 are integral components (e.g., the disk portion 504 and the bushing portion 506 are integral with each other). The compliant joint 404 can be manufactured via negative manufacturing (e.g., machining, etc.) and/or additive manufacturing. In other examples, the compliant joint 404 can be composed of multiple components. In some such examples, the components of the compliant joint 404 can be joined via one or more fastening techniques (e.g., one or more welds, one or more fasteners, one or more chemical adhesives, one or more press fits, one or more shrink fits, etc.). For example, the disk portion 504 and the bushing portion 506 can be manufactured separately and joined via a weld. The compliant joint 404 can be composed of a material that is rigid, fire-resistant, and capable of repeated elastic deformation, including, but not limited to, steel (e.g., medium-carbon steel, high-carbon steel, manganese alloyed steel, vanadium alloyed steel, silicon alloyed steel, spring-tempered austenitic stainless steel, etc.), nickel alloys, copper alloys, and/or composite materials (e.g., metal composites, reinforced plastics, etc.). Because the compliant joint 404 can be manufactured via comparatively lower cost materials (e.g., steel, etc.) and via comparatively lower cost manufacturing methods, the compliant joint 404 is a comparatively lower cost component than the spherical bearing 306 of FIGS. 3A and 3B. As such, the compliant joint 404 fulfills a similar role in the compliant feedthrough assembly 402 of FIG. 4 as the spherical bearing 306 of FIGS. 3A and 3B, except that the compliant joint 404 is cheaper to manufacture and service than the spherical bearing 306.

The disk portion 504 includes an example outer surface 512, an example first face 514 (e.g., a front face, a forward face, etc.), and an example second face 516 (e.g., a rear face, an aft face, etc.). The disk portion 504 is configured (e.g., via the slot pattern 510, etc.) to be elastically deformed (e.g., flex, etc.) from bending moments associated with the loading applied via operation of the rod 410. For example, during loading, the first face 514 can assume a generally concave profile (e.g., with a center of curvature defined by the pitch axis, with a center of curvature defined by the yaw axis, etc.) and the second face 516 can assume a corresponding convex profile. Similarly, the first face 514 can assume a generally convex profile and the second face 516 can assume a corresponding concave profile (e.g., with a center of curvature defined by the pitch axis, with a center of curvature defined by the yaw axis, etc.). In some examples, the outer surface 512 of the compliant joint 404 and the disk portion 504 can be retained by a gap between the lids 407, 408.

The bushing portion 506 includes an example boss 517, an example interior surface 518, and example third face 520 (e.g., a front face, a forward face, etc.). In the illustrated example of FIG. 5, the boss 517 extends (e.g., extrudes, etc.) outward from the first face 514 of the disk portion 504. The interior surface 518 defines an outer boundary of the cavity 416 of FIG. 4. The interior surface 518 of the bushing portion 506 receives an outer diameter of a rod (e.g., the rod 410 of FIG. 4, etc.) and permits translation of the rod through the bushing portion 506. In some examples, the interior surface 518 includes a low-friction liner and/or a low-friction coating (see FIG. 5) to reduce wear between the rod 410 and the bushing portion 506. Additionally or alternatively, the interior surface 518 can be lubricated. In the illustrated example of FIG. 5, the intersection of the extruding boss 517 and the first face 514 and the intersection of the interior surface 518 and the third face are filleted. In other examples, the intersections of the boss 517 and the first face 514 and the intersection of the interior surface 518 and the third face can other geometries (e.g., chamfers, bevels, etc.).

The slots 508A, 508B, 508C, 508D are formed within the disk portion 504 and increase the flexibility (e.g., the ability to elastically deform, etc.) of the compliant joint 404 when subjected to bending moments/torques. In the illustrated example of FIG. 5, the first slot 508A and the second slot 508B increase the flexibility of the compliant joint 404 to torques applied about the pitch (P) axis and the third slot 508C and the fourth slot 508D increase the flexibility of the compliant joint 404 to torques applied about the yaw (Y) axis. In the illustrated example of FIG. 5, each of the slots 508A, 508B, 508C, 508D have an example slot width 521 (e.g., the same slot width, etc.). In other examples, each of the slots 508A, 508B, 508C, 508D can have different slot widths. For example, increasing or decreasing the slot width 521 of the slots 508A, 508B correspondingly increases or decreases the flexibility of the compliant joint 404 about the pitch axis. Similarly, increasing or decreasing the slot width 521 of the slots 508C, 508D correspondingly increases or decreases the flexibility of the compliant joint 404 about the yaw axis. The slot pattern 510 is described in greater detail in conjunction with FIG. 5. While one example slot pattern 510 is depicted in FIGS. 4 and 5, the slots 508A, 508B, 508C, 508D can have any other suitable pattern (e.g., different radial and/or circumferential locations, etc.) depending on the expected torques borne by the compliant joint 404 and/or the sliding rod assembly 400.

In the illustrated example of FIG. 5, the slots 508A, 508B, 508C, 508D are generally arc-shaped (e.g., are parallel to the outer diameter of the compliant joint 404, etc.). In other examples, some or all of the slots 508A, 508B, 508C, 508D can be aligned along the yaw axis, aligned align along the pitch axis, extending radially from the bushing portion 506, parallel to the yaw axis, parallel to the pitch axis, etc.). In the illustrated example of FIG. 5, the slots 508A, 508B, 508C, 508D are continuous openings. In other examples, some or all of the slots 508A, 508B, 508C, 508D can be formed via a series of discrete holes/openings. Additionally or alternatively, some or all of the slots 508A, 508B, 508C, 508D can be absent. In some such examples, the disk portion 504 can include areas of thinner material thickness (e.g., areas corresponding to the location of the slots 508A, 508B, 508C, 508D, etc.) to similarly increase the flexibility of the disk portion 504.

The disk portion 504 and the compliant joint 404 has an example diameter 522 and the bearing portion 506 has an example interior diameter 524. In some examples, the diameter 522 of the compliant joint 404 is based on a size of the opening in the fire seal, a size of the opening driven by the lids 407, 408 of FIG. 4, etc. In some examples, the interior diameter 524 of the bushing portion 506 is based on a size of the rod 212 of FIG. 4. In the illustrated example of FIG. 5, the ratio of the diameter 522 to the interior diameter 524 is 4. In other examples, the ratio of the example diameter 522 to the interior diameter 524 can be a value between 1.5 and 10. In the illustrated example of FIG. 5, the ratio of the diameter 522 to the slot width 521 is 26. In other examples, the ratio of the example diameter 522 to the slot width 521 can be a value between 15 and 75.

In the illustrated example of FIG. 5, the disk portion 504 has an example thickness 528. In some examples, the thickness of the disk portion 504 can be based on a desired flexibility of the compliant joint 404 and/or the thickness of the seal wall (e.g., the seal wall 202 of FIG. 2, etc.). In the illustrated example of FIG. 5, the bushing portion 506 has an example length 530. The greater comparative length 530 of the boss 517 (e.g., when compared to the thickness 528 disk portion 504, etc.) distributes the load applied by the rod 410 over a larger surface area, thereby reducing fatigue and wear to areas of the interior surface 518. In some examples, the compliant joint 404 can include a similar boss extending from the second face 516 (see FIG. 5). In other examples, the compliant joint 404 does not include a boss extending from the second face 516 (e.g., the bushing portion 506 is flush with the second face 516, etc.) and/or the first face 514 (e.g., the bushing portion 506 is flush with the first face 514, etc.). In the illustrated example of FIG. 5, the ratio of the length 530 to the interior diameter 524 is 0.5. In other examples, the ratio of the example length 530 to the interior diameter 524 can be a value between 0.2 and 1.0.

Figure 6:
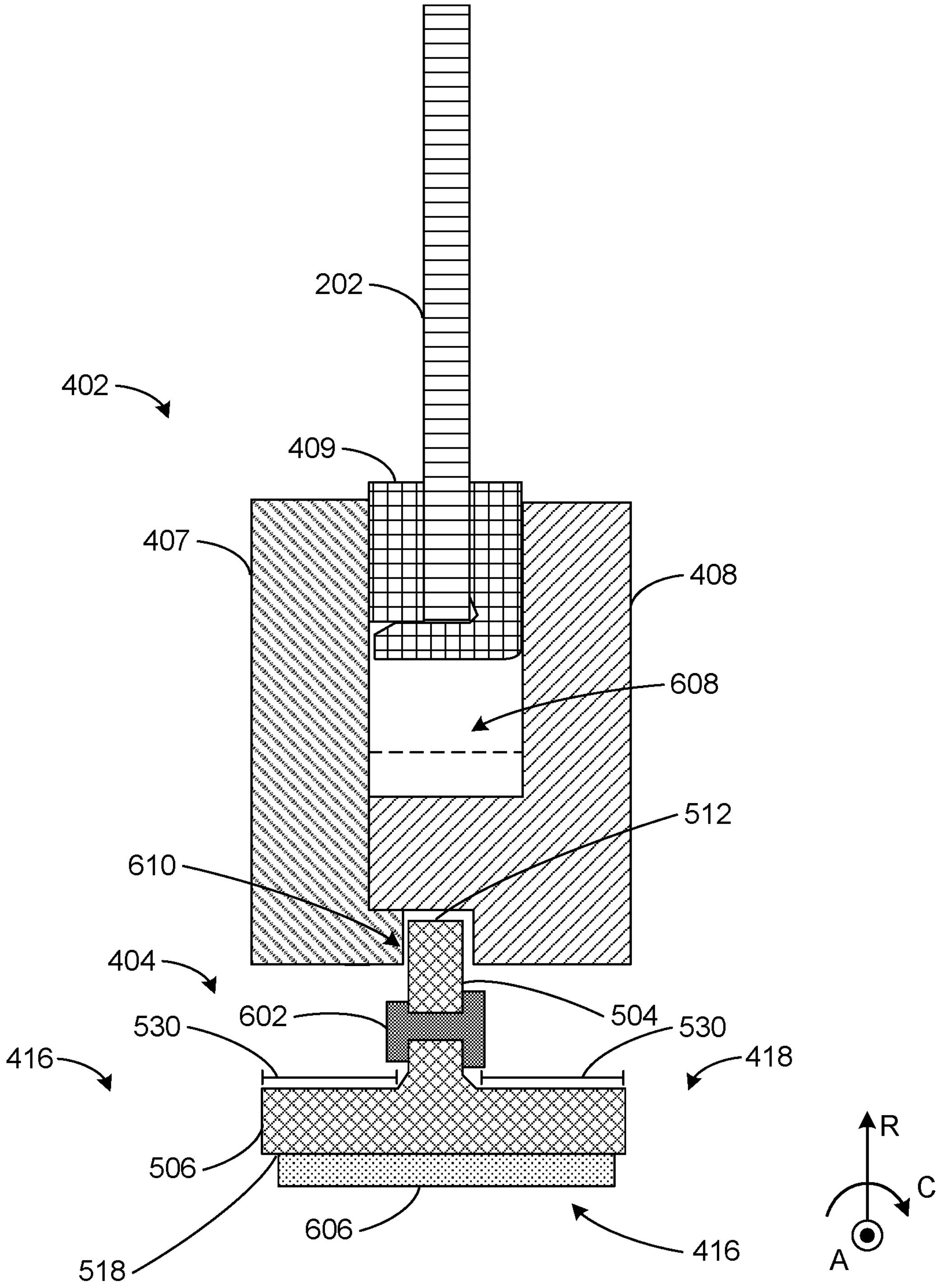
FIG. 6 is a cross-sectional view of the sliding rod assembly of FIG. 4.

FIG. 6 is a partial cross-sectional view of an upper portion of the compliant feedthrough assembly 402 of FIG. 4 disposed in the seal wall 202 of FIG. 2. In the illustrated example of FIG. 6, the compliant feedthrough assembly 402 includes the compliant joint 404, the first lid 407, the second lid 408, an example seal 602, and an example wall adapter 409, and an example liner 606. In the illustrated example of FIG. 6, the lids 407, 408 and the wall adapter 409 define an example gap 608. FIG. 6 is not to scale with FIG. 5 and is included for illustrative/descriptive purposes only.

In the illustrated example of FIG. 6, the seal 602 is disposed within the example slot 508A and similar seals are disposed within the slots 508B, 508C, 508D (not illustrated in FIG. 6). The seal 602 prevents fire from spreading from the second cavity 418 to the first cavity 416 without decreasing (e.g., measurably decreasing, etc.) the flexibility of the compliant joint 404. The seal 602 can be an elastomer seal composed of any fire-resistant elastomer, including, but not limited to, silicone rubber (e.g., room temperature vulcanizing (RTV) silicone rubber, etc.), fluoropolymer elastomers, other elastomers including fire retardant additives, etc. In some examples, the seal 602 can be integrally molded within the first slot 508A and/or around the slot pattern 510 (e.g., all of the slot pattern 510 of FIG. 5, around a portion of the slot pattern 510, etc.). In other examples, the seal 602 can be manufactured and disposed within the first slot 508A. In some examples, the seal 602 and/or other seals similar to seal 602 is disposed within each of the slots 508A, 508B, 508C, 508D to inhibit the spread of fire through the compliant joint 404 and/or dampen vibration of the compliant joint 404.

The liner 606 is low-friction material disposed within the cavity 416 on the interior surface 518 of the bushing portion 506 to reduce the wear caused by the movement of the rod 410 within the cavity 416. The liner 606 can be composed of plastic, fiberglass, bronze, polyethylene terephthalate (PETE), perfluoroalkoxy alkane (PFA), fluorinated ethylene propylene (FEP), Polytetrafluoroethylene (PTFE), aluminum-silicon alloy, etc. In some examples, the liner 606 can be absent. In some such examples, the rod 410 and/or the cavity 416 can be lubricated via a lubricant.

In the illustrated example of FIG. 6, the disk portion 504 of the compliant joint 404 is disposed in an example groove 610 formed by the abutment of the first lid 407 and the second lid 408. In the illustrated example of FIG. 6, the interior surface of the groove 610 includes portions of the first lid 407 and portions of the second lid 408. In other examples, the groove 610 can be formed entirely by the first lid 407 or entirely by the second lid 408. The groove 610 receives the outer portion of the disk portion 504 and retains the compliant joint 404 within the lids 407, 408.

In the illustrated example, of FIG. 6, the gap 608 is an annular opening formed between the first lid 407, the second lid 408 and the wall adapter 409. During operation, the rod 410 can exert a radial force on the compliant joint 404, which is reacted by the interface between the second lid 408 and the outer surface 512. Because the second lid 408 is coupled to the first lid 407, the force applied on the second lid 408 can cause the first lid 407, the second lid 408, and the compliant joint 404 to move within the gap 608. For example, if the rod 410 applies force in a positive radial direction, the compliant joint 404 and the lids 407, 408 can translate in the positive radial direction, thereby reducing the size of the gap 608 in the positive radial direction and increasing the size of the gap 608 in the negative radial direction. In some examples, an additional gap (not illustrated) can be disposed between the wall adapter 409 and the first lid 407 and the wall adapter 409 and the second lid 408 to enable axial motion (e.g., sliding, etc.) of the lids 407, 408. While the gap 608 is depicted in FIG. 6 as an empty space, in other examples, the gap 608 can be filled with a compressible material (e.g., an elastomer, a foam, etc.). In some examples, the fasteners (e.g., the fasteners extending through the holes 414A, 414B, 414C, 414D of FIG. 4, etc.) coupling the first lid 407 and the second lid 408 can extend partially through the gap 608.

FIG. 7 is an illustration of the slot pattern 510 of FIG. 5. In the illustrated example of FIG. 7, the slot pattern 510 is defined with respect to an example centerline axis 700, which corresponds to the centerline of the cavity 416 of FIGS. 4-6 and/or the bushing portion 506 of FIGS. 5 and 6. In the illustrated example of FIG. 7, the first slot 508A is displaced at an example first radial displacement 702 from centerline axis 700, the second slot 508B is displaced at an example second radial displacement 704 from centerline axis 700, the third slot 508C is displaced at an example third radial displacement 706 from centerline axis 700, and the fourth slot 508D is displaced at an example fourth angular displacement 708 from centerline axis 700. In the illustrated example of FIG. 7, the first slot 508A defines an example first angular displacement 710, the second slot 508B defines an example second angular displacement 712, the third slot 508C defines an example third angular displacement 714, and the fourth slot 508D defines an example fourth angular displacement 716.

In the illustrated example of FIG. 7, the first slot 508A and the second slot 508B are mirrored about the pitch axis and each of the slots 508A, 508B is symmetrical about the yaw axis. In the illustrated example of FIG. 7, the third slot 508C and the fourth slot 508D are mirrored about the yaw axis and each of the slots 508C, 508D is symmetrical about the pitch axis. That is, the first slot 508A and the second slot 508B are bisected by the yaw axis and the slot 508C and the fourth slot 508D are bisected by the pitch axis. While the slots 508A, 508B, 508C, 508D are arc-shaped in the examples of FIGS. 4-7, in other examples, the slots 508A, 508B, 508C, 508D can have any other suitable shape and/or be implemented by a plurality of discrete holes. The slot pattern 510 includes the four slots 508A, 508B, 508C, 508D. In other examples, the slot pattern 510 can include any other suitable number of slots (e.g., 1 slot, 2 slots, 3 slots, 5 slots, 8 slots, 12 slots, etc.).

In the illustrated example of FIG. 7, the first radial displacement 702 and the second radial displacement 704 are equal. In the illustrated example of FIG. 7, the third radial displacement 706 and the second radial displacement 708 are equal and less than the radial displacements 702, 704. In other examples, the third radial displacement 706 and the second radial displacement 708 can be greater than the first radial displacement 702 and the 704. In the illustrated example of FIG. 7, the angular displacements 710, 712, 714, 716 are equal in angular displacement, but the angular displacements 714, 716 are shorter than the angular displacements 710, 712 due to the greater radial displacement of the slots 508A, 508B.

From the foregoing, it will be appreciated that example systems, apparatus, and articles of manufacture have been disclosed that reduce the manufacturing and servicing cost of feedthrough assembly by using annular joints including slots in place of spherical bearings. The annular joints disclosed herein include slots that allow the joints to elastically flex in response to forces exerted by a rod extending therethrough. Examples disclosed herein prevent fire from spreading over a seal wall to heat or otherwise damage components protected by the seal wall.

Further aspects of the present disclosure are provided by the subject matter of the following clauses:

Example 1 includes an apparatus to be disposed within a seal wall comprising a bushing portion including a hole to receive a rod extending through the bushing portion, and a disk portion including a slot, the disk portion being concentric with the bushing portion.

Example 2 includes the apparatus of any preceding clause, wherein the disk portion and the bushing portion are integral.

Example 3 includes the apparatus of any preceding clause, further including an elastomer seal disposed within the slot.

Example 4 includes the apparatus of any preceding clause, wherein the slot is arc-shaped and has a first angular displacement at a first radial displacement from a centerline axis of the hole.

Example 5 includes the apparatus of any preceding clause, wherein the slot is a first slot and the disk portion includes a second slot, the second slot having the first angular displacement at the first radial displacement.

Example 6 includes the apparatus of any preceding clause, wherein the bushing portion defines a first axis bisecting the bushing portion, the first slot and the second slot being symmetrical about the first axis.

Example 7 includes the apparatus of any preceding clause, wherein the slot is a first slot, the disk portion including a second slot, the second slot having the first angular displacement at a second radial displacement different than the first angular displacement.

Example 8 includes the apparatus of any preceding clause, wherein the bushing portion defines a first axis bisecting the first slot and a second axis bisecting the second slot, the first axis perpendicular to the second axis.

Example 9 includes the apparatus of any preceding clause, further including the rod, a first lid, and a second lid abutting the first lid, an abutment of the first lid and the second lid defining an annular groove, the annular groove retaining the disk portion.

Example 10 includes the apparatus of any preceding clause, further including a wall adapter radially outboard of the annular groove, the wall adapter to receive an opening of the sealing wall.

Example 11 includes a gas turbine engine comprising a sealing wall including an opening, an actuator disposed on a first side of the sealing wall, a control arm disposed on a second side of the sealing wall, and a sliding rod assembly including a rod including a first end coupled to the actuator, and a second end coupled to the control arm, and a joint disposed in the opening, the joint including a bushing portion, the rod extending through the bushing portion, and a disk portion including a slot, the disk portion being concentric with the bushing portion.

Example 12 includes the gas turbine engine of any preceding clause, wherein the disk portion and the bushing portion are integral.

Example 13 includes the gas turbine engine of any preceding clause, further including an elastomer seal disposed within the slot.

Example 14 includes the gas turbine engine of any preceding clause, wherein the slot is arc-shaped and has a first angular displacement at first radial displacement from a centerline axis of the joint.

Example 15 includes the gas turbine engine of any preceding clause, wherein the slot is a first slot, and the disk portion includes second slot, the second slot having the first angular displacement at the first radial displacement.

Example 16 includes the gas turbine engine of any preceding clause, wherein the joint defines a first axis bisecting the bushing portion, the first slot and the second slot being symmetrical about the first axis.

Example 17 includes the gas turbine engine of any preceding clause, wherein the slot is a first slot, the disk portion including a second slot, the second slot having the first angular displacement at a second radial displacement different than the first angular displacement.

Example 18 includes the gas turbine engine of any preceding clause, wherein the joint defines a first axis bisecting the first slot and a second axis bisecting the second slot, the first axis perpendicular to the second axis.

Example 19 includes the gas turbine engine of any preceding clause, wherein the sliding rod assembly further includes a first lid, and a second lid abutting the first lid at a first location, an abutment of the first lid and the second lid defining an annular groove, the annular groove retaining the disk portion.

Example 20 includes the gas turbine engine of any preceding clause, wherein the sliding rod assembly further includes a wall adapter radially outboard of the annular groove, the wall adapter to receive the sealing wall.

The following claims are hereby incorporated into this Detailed Description by this reference, with each claim standing on its own as a separate embodiment of the present disclosure.

What is claimed is:

1. An apparatus to be disposed within a seal wall comprising:
- a bushing portion including a hole to receive a rod extending through the bushing portion; and
- a disk portion concentric with the bushing portion, the disk portion including:
  - a first enclosed slot spaced apart from the bushing portion by a first radial displacement; and
  - a second enclosed slot spaced apart from the bushing portion by a second radial displacement, the first radial displacement different than the second radial displacement; and
- a first lid; and
- a second lid abutting the first lid, an abutment of the first lid and the second lid defining an annular groove, the annular groove retaining the disk portion.

2. The apparatus of claim 1, wherein the disk portion and the bushing portion are integral.

3. The apparatus of claim 1, further including an elastomer seal disposed within the first enclosed slot.

4. The apparatus of claim 1, wherein the first enclosed slot is arc-shaped and has a first angular displacement.

5. The apparatus of claim 4, wherein the first enclosed slot is a first slot and the disk portion includes a third slot, the third slot having the first angular displacement at the first radial displacement.

6. The apparatus of claim 5, wherein the bushing portion defines a first axis bisecting the bushing portion, the first slot and the third slot being symmetrical about the first axis.

7. The apparatus of claim 1, wherein the bushing portion defines a first axis bisecting the first enclosed slot and a second axis bisecting the second enclosed slot, the first axis perpendicular to the second axis.

8. The apparatus of claim 1, wherein the abutment of the first lid and the second lid defines a gap outboard of the annular groove.

9. The apparatus of claim 8, further including a wall adapter radially outboard of the annular groove, the wall adapter to receive an opening of the sealing wall, the first lid and the second lid moveable within the gap relative to the wall adapter.

10. A gas turbine engine comprising:
- a sealing wall including an opening;
- an actuator disposed on a first side of the sealing wall;
- a control arm disposed on a second side of the sealing wall; and
- a sliding rod assembly including:
  - a rod including:
    - a first end coupled to the actuator; and
    - a second end coupled to the control arm; and a joint disposed in the opening, the joint including:

a bushing portion, the rod extending through the bushing portion; and a disk portion including an enclosed slot spaced apart from the bushing portion, the disk portion being concentric with the bushing portion.

11. The gas turbine engine of claim 10, wherein the disk portion and the bushing portion are integral.

12. The gas turbine engine of claim 10, further including an elastomer seal disposed within the enclosed slot.

13. The gas turbine engine of claim 10, wherein the enclosed slot is arc-shaped and has a first angular displacement at a first radial displacement from a centerline axis of the joint.

14. The gas turbine engine of claim 13, wherein the enclosed slot is a first slot, and the disk portion includes a second slot, the second slot having the first angular displacement at the first radial displacement.

15. The gas turbine engine of claim 14, wherein the joint defines a first axis bisecting the bushing portion, the first slot and the second slot being symmetrical about the first axis.

16. The gas turbine engine of claim 13, wherein the enclosed slot is a first slot, the disk portion including a second slot, the second slot having the first angular displacement at a second radial displacement different than the first radial displacement.

17. The gas turbine engine of claim 16, wherein the joint defines a first axis bisecting the first slot and a second axis bisecting the second slot, the first axis perpendicular to the second axis.

18. The gas turbine engine of claim 10, wherein the sliding rod assembly further includes:

a first lid; and a second lid abutting the first lid at a first location, an abutment of the first lid and the second lid defining an annular groove, the annular groove retaining the disk portion.

19. The gas turbine engine of claim 18, wherein the sliding rod assembly further includes a wall adapter radially outboard of the annular groove, the wall adapter to receive the sealing wall.

* * * * *